United States Patent [19]

Muzechuk

[11] Patent Number: 4,611,795
[45] Date of Patent: Sep. 16, 1986

[54] HYDRAULIC-ELASTOMERIC MOUNT

[75] Inventor: Richard A. Muzechuk, Kettering, Ohio

[73] Assignee: General Motors Corporation, Detroit, Mich.

[21] Appl. No.: 678,356

[22] Filed: Dec. 5, 1984

Related U.S. Application Data

[63] Continuation-in-part of Ser. No. 461,612, Jan. 27, 1983, abandoned.

[51] Int. Cl.⁴ .................... F16M 5/00; F16F 15/04; F16L 55/04
[52] U.S. Cl. .................................. 267/140.1; 138/30; 267/8 R
[58] Field of Search ............ 267/8 R, 8 D, 35, 140.1, 267/140.3, 141.5, 113, 118, 136, 134; 248/562, 632, 634, 636; 251/331; 138/30; 137/513.3; 92/96, 98 R, 100; 73/278; 188/370; 277/212 FB; 74/18.2

[56] References Cited

U.S. PATENT DOCUMENTS

| 365,767 | 6/1887 | Zilles | 251/331 X |
|---|---|---|---|
| 2,387,066 | 10/1945 | Harding | 267/134 |
| 2,457,749 | 12/1948 | Thiry | 267/140.1 |
| 2,840,000 | 6/1958 | Giramenzi | 137/513.3 X |
| 2,851,059 | 9/1958 | Lucien | 138/30 |
| 3,381,591 | 5/1968 | Toschkoff | 74/18.2 X |
| 3,528,301 | 9/1970 | Wasmer | 188/370 |
| 4,159,091 | 6/1979 | Le Salver | 248/562 |
| 4,161,304 | 7/1979 | Brenner et al. | 248/562 |
| 4,215,842 | 8/1980 | Brenner et al. | 248/562 |
| 4,315,527 | 2/1982 | Donnenberg et al. | 138/30 |
| 4,383,679 | 5/1983 | Kakimoto | 267/8 R |
| 4,416,445 | 11/1983 | Coad | 267/35 |
| 4,418,897 | 12/1983 | Hartel et al. | 267/140.1 |
| 4,432,537 | 2/1984 | Pletsch | 248/562 X |
| 4,437,653 | 3/1984 | Kakimoto | 267/140.1 |

FOREIGN PATENT DOCUMENTS

| 0813161 | 9/1951 | Fed. Rep. of Germany | 92/98 R |
|---|---|---|---|
| 0057-964 | 4/1982 | Japan | 277/212 FB |
| 0904925 | 9/1962 | United Kingdom | 248/632 |
| 1537492 | 12/1978 | United Kingdom | 92/96 |
| 2041485 | 9/1980 | United Kingdom | 267/140.1 |

OTHER PUBLICATIONS

Automotive Engineering, Aug. 1981, p. 92.

Primary Examiner—Bruce H. Stoner, Jr.
Assistant Examiner—Robert J. Oberleitner
Attorney, Agent, or Firm—R. L. Phillips

[57] ABSTRACT

A hydraulic-elastomeric mount is disclosed having a multi-function diaphragm that in addition to forming a secondary chamber also serves to provide amplitude control and multiple sealing.

3 Claims, 12 Drawing Figures

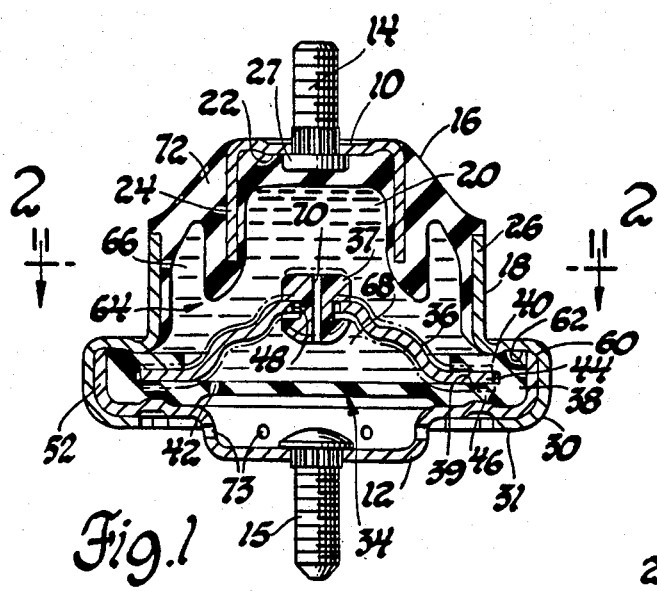
Fig.1
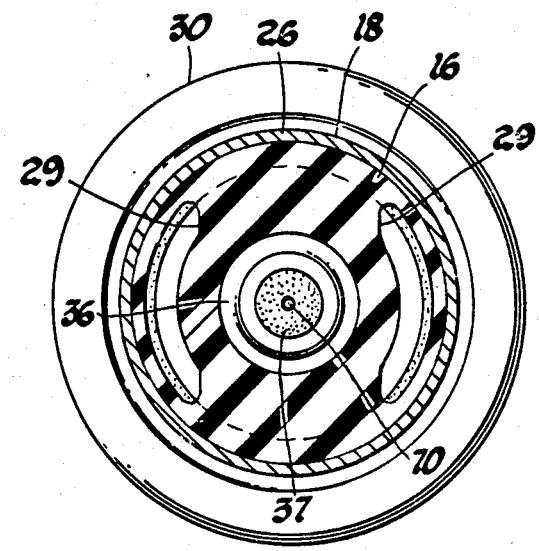
Fig.2
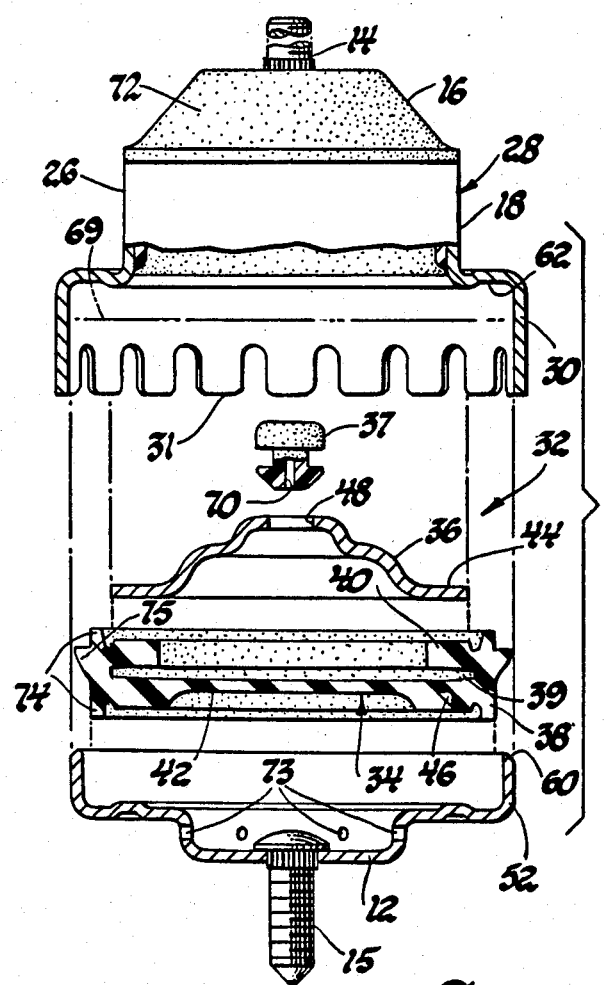
Fig.3
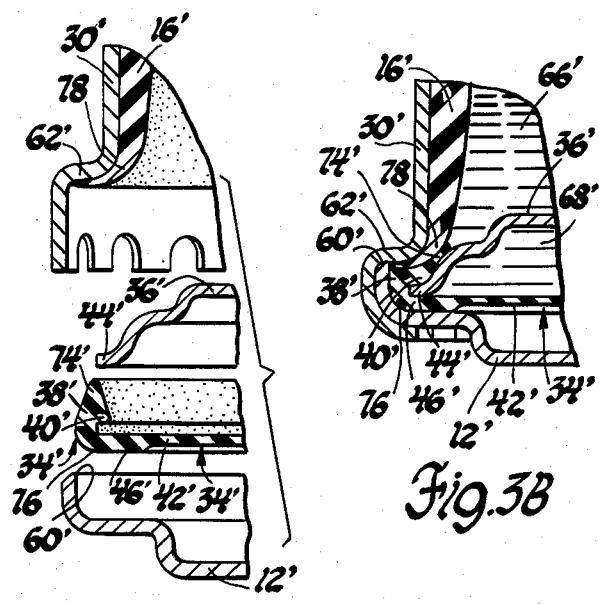
Fig.3A
Fig.3B

HYDRAULIC-ELASTOMERIC MOUNT

This is a continuation-in-part of U.S. patent application Ser. No. 461,612 filed Jan. 27, 1983, now abandoned.

This invention relates to a hydraulic-elastomeric mount and more particularly to the provision therein of a multi-function diaphragm.

In the typical mount such as used for vehicle engines an elastomeric body is employed made of natural or synthetic rubber. Such materials have inherently low coefficients of damping and it has been found that many of the vibratory inputs to the vehicle would be better isolated if the engine mounting system exhibited a higher coefficient of damping. It is possible to provide an increased damping coefficient by the selection of certain rubber polymers and the use of additives but thus far this has proven unsatisfactory because of accompanying adverse affects on the properties of the rubber. Furthermore, this approach produces large damping for all vibratory inputs regardless of frequency or amplitude. Thus, there is a major desire for a cost effective means of providing increased damping that does not dictate the choice of rubber used for the elastomeric body. Then there is also the desire that the amount of damping be controllable as to its magnitude for vibratory inputs of various frequencies and amplitudes. Furthermore, the damping should be achieved in a manner that does not compromise the many desired features in the typical elastomeric mount design and particularly those of major importance such as specific stiffness ratios along the major axes and specific configurations to suit packaging space restrictions. Various mount designs have been proposed adding hydraulic damping, however, they are generally lacking in meeting all the desired criteria and particularly that of damping controllability or are relatively complex and difficult to manufacture while maintaining a high degree of sealed integrity.

The hydraulic-elastomeric mount of the present invention is a very simple, easy to manufacture design with excellent sealed integrity and is adapted to be produced as a family of mounts capable of providing a wide range of desired characteristics to various degrees and without compromising the desired vibration isolating features available with just the elastomeric body. The preferred embodiment comprises a pair of mounting members interconnected by a hollow elastomeric body. As adapted for use as a vehicle engine mount, one of the mounting members is secured to the engine while the other mounting member is secured to the engine supporting structure of the vehicle. To this arrangement is added an elastomeric diaphragm that is configured so as to close the elastomeric body and form therewith a closed cavity. A rigid partition is then used to divide the cavity into a primary chamber enclosed by the elastomeric body and a secondary chamber enclosed by the diaphragm. A liquid is contained in the chambers and the partition is provided with an orifice which interconnects the chambers. The liquid is thus forced to flow at a restricted rate from the primary to the secondary chamber upon contraction of the former and in the opposite direction on expansion thereof to provide a damping effect as the one mounting member vibrates relative to the other. The diaphragm is further configured so as to extend about and also over the periphery of the partition and thereby form a seal between the chambers and the exterior of the mount as well as between the chambers. Moreover, the diaphragm is configured to have a certain compliance at its rim permitting limited substantially free or soft travel of the partition below a predetermined vibration amplitude of one mounting member relative to the other and to prevent such relative travel above such amplitude so that flow through the orifice to effect damping is dependent upon the predetermined vibration amplitude.

Thus, in the present invention the diaphragm is tri-functional in that in addition to forming the secondary chamber, it also serves to provide amplitude control and multiple sealing. Furthermore, the total design is such that offers a wide family of mounts. This is accomplished by the orifice being designed as a separate and relatively movable part which mounts on the partition with a limited free travel so as to permit small inputs without damping for further amplitude control as well as offer a selection of orifice diameter, length and shape for various damping responsiveness. Further extension of the family is provided by varying the compliance as well as the durometer of the diaphragm as well as varying the wall thickness, shape and durometer of the hollow elastomeric body interconnecting the mounting members. Another advantage is that the hollow elastomeric body can be formed with a standard two-piece mold with no loose cores using either injection or transfer molding and with little excess rubber removal required. Furthermore, assembly is simplified by the formation of the orifice, partition and diaphragm as one subassembly and the molded formation of the elastomeric body with one of the mounting members and a retainer as a second subassembly which is filled with the hydraulic fluid prior to final assembly. At final assembly, the two subassemblies are simply brought together and the retainer is then crimped or otherwise fixed to the remaining other mounting member to retain all the mount parts together.

These and other objects, advantages and features of the present invention will become more apparent from the following description and drawing in which:

FIG. 1 is sectional view of one embodiment of the hydraulic-elastomeric mount constructed according to the present invention.

FIG. 2 is a sectional view taken on the line 2—2 in FIG. 1.

FIG. 3 is an exploded view of the mount in FIG. 1.

FIG. 3A is a partial exploded view of the mount in FIG. 1 but with another embodiment of the diaphragm according to the present invention.

FIG. 3B is a partial sectional view of the mount in FIG. 3A.

Figure 4:
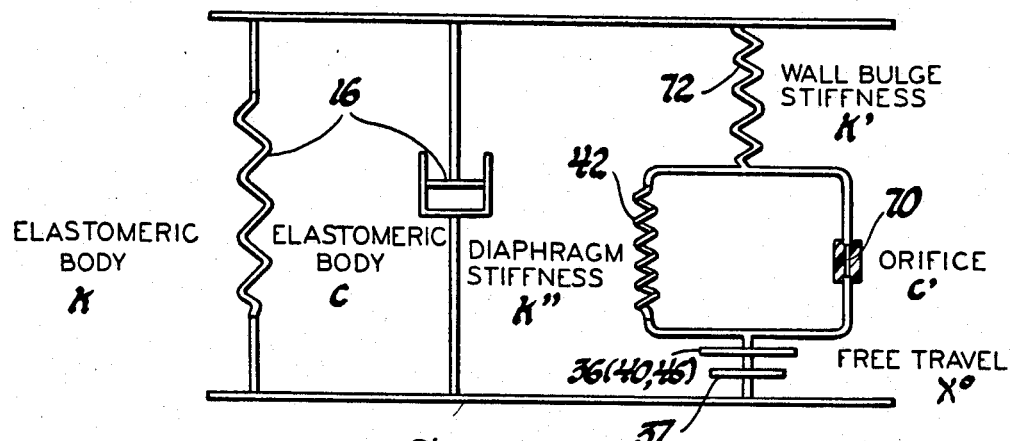

FIG. 4 diagrammatically shows a mechanical analogy of the hydraulic-elastomeric mount of the present invention.

FIGS. 5–8 are graphs showing various characteristics of the hydraulic-elastomeric mount of the present invention (solid line curves) compared with those of a typical conventional mount having only an elastomeric body (dash line curves).

Figure 9:
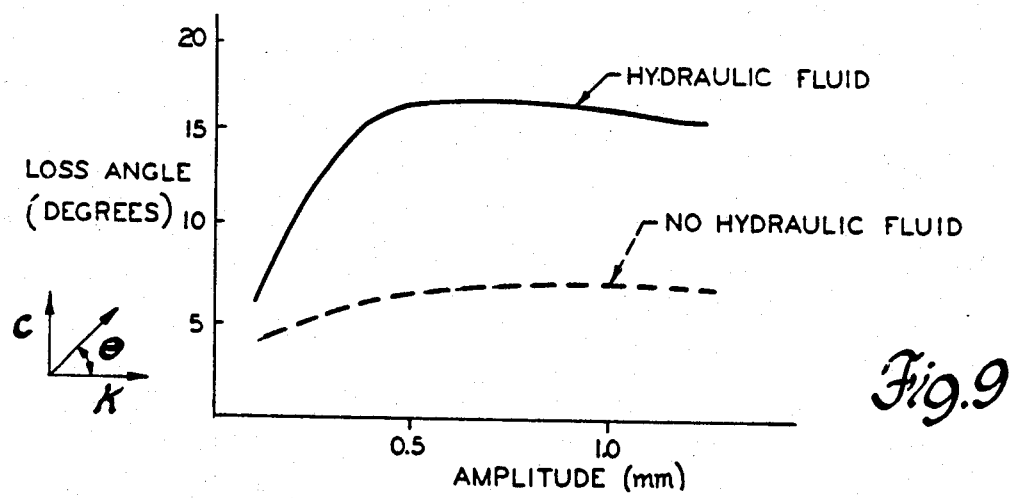
Figure 10:
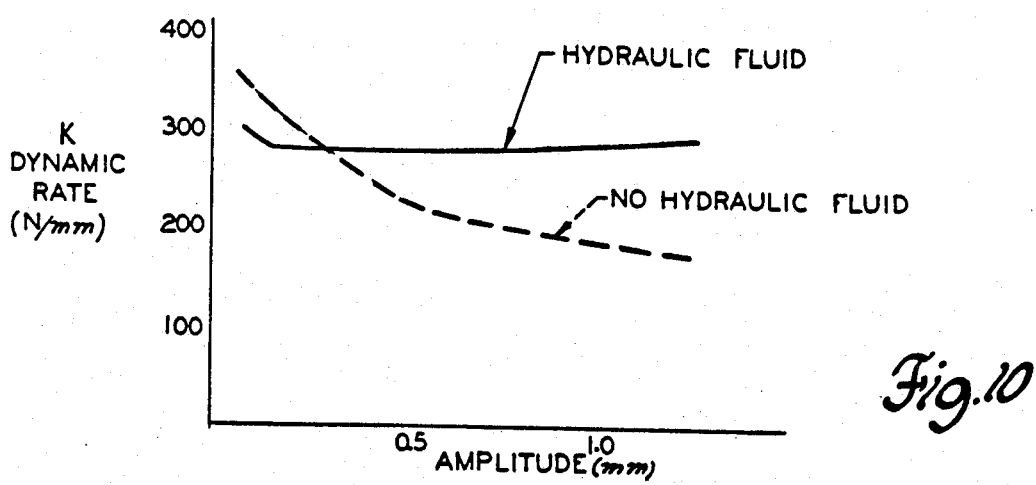

FIGS. 9 and 10 are graphs showing various characteristics of the hydraulic-elastomeric invention of the present invention with hydraulic fluid (solid line curves) and without hydraulic fluid (dash line curves).

Referring to FIGS. 1–3 there is shown the hydraulic elatomeric mount according to the present invention adapted for mounting an engine in a vehicle. The mount has a generally stepped cylindrical shape and comprises a pair of stamped sheet metal mounting members 10 and 12 which have a circular cup and saucer shaped configuration respectively. The mounting members 10 and 12 are arranged with their concave sides facing each other and have a stud 14 and 15 respectively secured to the center thereof and projecting outward therefrom for attachment to an engine (not shown) and an engine supporting member such as a frame or cradle (not shown) of the vehicle. A hollow elastomeric body 16 made of natural or synthetic rubber interconnects the mounting members 10 and 12 and to this end, is molded about the cup-shaped mounting member 10 and to the interior of a stamped sheet metal hollow retainer 18.

The elastomeric body 16 is configured such that it essentially completely defines a hollow cavity 20 therein covering the bottom 22 and both sides of the cylindrical wall 24 of the mounting member 10 and also the inner side of the cylindrical wall 26 of the retainer 18. The elastomeric body 16 thus completely covers the head 27 of the stud 14 so as to positively prevent any possible leakage therepast while also having extensive surface attachment with both the mounting member 10 and the retainer 18. Moreover, the mounting member 10 with its stud 14, elastomeric body 16 and the retainer 18 form a subassembly shown and designated as 28 in FIG. 3. It will be seen that the subassembly 28 can thus be made with a conventional two-piece mold without separate or loose core pieces using either injection or transfer molding and with little finishing such as flash rubber removal required. And this includes the formation of directional rate control effecting cavities or voids within the elastomeric body itself. For example, with diametrically oppositely located cavities 29 as shown, the mount is provided with a high or hard rate in one crosswise direction and both a relatively soft or low rate at low amplitudes and a non-linear high or hard rate at high amplitudes in a direction transverse thereto (vertical and horizontal direction respectively as viewed from the top in FIG. 2), such difference in rates being especially useful in isolating certain combustion engine vibrations as is well known in the art.

As shown in FIG. 3, the retainer 18 of subassembly 28 is initially formed with an unfolded collar 30 having a scalloped edge 31 so as to receive a second subassembly 32 comprising the other mounting member 12, an elastomeric diaphragm 34 of natural or synthetic rubber, a stamped sheet metal circular dish-shaped partition 36 and an orifice member 37. The elastomeric diaphragm 34 has a circular rim section 38 with a radially inwardly facing internal groove 39 and the shoulder 40 on the side of the groove opposite the spanning central portion 42 of the diaphragm is flexible to receive the rim 44 of the partition 36. The partition rim 44 is thus sandwiched as shown in FIG. 1 between the shoulder 40 and the shoulder 46 on the opposite side of the groove, the latter shoulder being formed integral with and extending radially outward from the central diaphragm portion 42 to join the latter with the diaphragm rim portion 38. The partition 36 is positioned with its concave side facing downwardly and has a central aperture 48 therethrough into which the orifice member 37 of elastomeric material is adapted to be inserted and retained with a slip fit. This slip fit permits limited free travel of the orifice member 37 relative to the partition 36 in addition to limited substantially free or soft travel of the latter provided by compliance of the diaphragm rim 38 and these free travels operate to prevent hydraulic damping below a predetermined low amplitude as described in more detail later.

The lower mounting member 12 with its stud 15 is shaped with a collar 52 to receive the rim 38 of the diaphragm 34 with the partition 36 in place and the orifice member 37 fitted to the latter with such subassembly 32 then adapted to be fit into the yet to be clinched collar 30 of the retainer 18 of the other subassembly 28. In such fit, the lower mounting member 12 is telescopically received in the retainer collar 30 with the rim 38 of the diaphragm pressed therebetween whereafter the scalloped edge 31 of the retainer is clinched over the collar 52 on the lower mounting member to retain all the mount parts together as shown in FIG. 1. In the assembly, the upper edge 60 of the lower mounting member 12 engages the radial shoulder 62 of the retainer collar to determine the preload on the diaphragm rim 38 which plays an important part in amplitude control as well as sealing as will be described in more detail later.

As seen in FIG. 1, the elastomeric diaphragm 34 closes the elastomeric body 16 so as to form therewith a closed cavity generally designated as 64. Furthermore, the partition 36 divides the cavity 64 into a primary chamber 66 enclosed by the elastomeric body 16 and a secondary chamber 68 enclosed by the diaphragm 34. However, prior to the closure of the cavity 64 at assembly, it is substantially filled with a liquid such as a commercial anti-freeze that will not freeze in the environment of the intended usage. This filling is readily accomplished by simply inverting the subassembly 28 and filling to a certain level 69 in the retainer 18 (see FIG. 3) such that the secondary chamber 68 is then filled through the orifice 70 on fitting and clamping of the subasembly 32.

The orifice member 37 has a central passage 70 of constant diameter extending centrally therethrough which interconnects the chamber 66 and 68 so as to permit the liquid in the primary chamber to flow at a restricted rate into the secondary chamber upon contraction of the primary chamber and in the opposite direction on expansion thereof to thereby provide a damping effect. Upon contraction of the primary chamber 66, the wall section 72 of the elastomeric body 16 extending angularly between the mounting member 10 and the retainer 18 is caused to bulge outwardly while the liquid therein is forced to flow through the orifice 70 into the chamber 78 to expand the latter as permitted by the elasticity of the diaphragm's central portion 42. Then on reversal in amplitude and resultantly expansion of the primary chamber 66, the stretched central diaphragm portion 42 retracts and thereby contracts the secondary chamber 68 forcing the liquid to flow back through the orifice into the primary chamber to complete the cycle. To otherwise permit free expansion and contraction of the secondary chamber 68, the space between the diaphragm 34 and the lower mounting member 12 is vented to atmosphere through a plurality of radial holes 73 formed in the latter. And because the diaphragm 34 is configured at its rim 38 to both extend around and over the rim 44 of the partition 36, there may be formed a seal not only between the chambers but also a double seal between the chambers and the exterior resulting in excellent sealed integrity of the mount as will be described in more detail later.

Moreover, the diaphragm rim 38 is configured so as to permit limited substantially free or soft travel of the partition 36 relative to the mounting members 10 and 12 below a predetermined low vibration amplitude of one mounting member relative to the other and to prevent such relative travel above such amplitude so that flow through the orifice 70 to effect damping does not occur until such predetermined low vibration amplitude is exceeded. Such free travel of the partition 36 is shown in FIG. 1 as being between the two phantom-line positions and may be as much as ±1.0 mm depending on the installation. This provides precise amplitude control and is simply effected with a predetermined compliance of the diaphragm rim 38 between the sandwiching retainer 18 and mounting member 12. To this end, the diaphragm rim 38 is free formed as shown in FIG. 3 so as to have oppositely facing annular sealing beads 74 at the outer perimeter and thinner but more radially extensive wall sections in the groove shoulders 40 and 46 which sandwich the partition rim 44. There is thus substantially more compliance of the sealing beads 74 which flatten at assembly to effect excellent sealing while the partition capturing elastomeric wall sections 40 and 46 are preloaded to a predetermined extent dependent on the amplitude responsiveness desired. Furthermore as to sealing, there is provided in addition to the face seal beads 74 an intermediate radially projecting annular edge sealing bead 75. The edge seal bead 75 has an interference fit with the interior of the retainer collar 30 and thereby cooperates with both of the face seal beads 74 to provide double sealing between the chambers 66, 68 and atmosphere. On the other hand, the hydraulically biased partition 36 is alternately pressed against the elastomeric shoulders 40 and 46 of the diaphragm so as to maintain tight sealing between the chambers 66 and 68. For example, assuming that the primary chamber 66 is contracting and the hydraulic pressure therein increasing, the partition 36 is hydraulically pressed into very tight sealing contact with the shoulder 46 while the other shoulder 40 is relaxing with such partition movement and while the double sealing provided by the sealing beads 74 and 75 remains unaffected because of the effective isolation therefrom by reason of their radially outward location relative to the partition. Then when the secondary chamber 68 is contacting and the hydraulic pressure therein increasing during the remainder of each damping cycle, the partition 36 is hydraulically pressed into very tight sealing contact with the shoulder 40 to thereby maintain tightly sealed integrity between the chambers while the other shoulder 46 relaxes and while double sealing is maintained between the chambers and atmosphere by the sealing beads 74 and 75. And it will now be better appreciated that the earlier described limited free travel of the orifice member 37 which is shown as being between the phantom-line positions shown in FIG. 1 operates to thus effectively increase the displacement of the chamber being contracted to thereby further delay damping but not to the same extent possible with the much larger displaceable chamber surface of the partition 36.

Another but simpler embodiment of the diaphragm of the present invention as used in the mount in FIG. 1 is shown in FIGS. 3A and 3B wherein like numbers only primed are used to identify corresponding parts or portions and modifications thereof and a new number is used to identify a substituted portion. As to the simplification, the rim 38' of the diaphragm 34' is now free formed as shown in FIG. 3A so as to have adjacent its perimeter only the one raised sealing bead 74' on the primary chamber side with the sealing on the other diaphragm rim side then provided by reducing the previously described bead on this side to a simple annular flat sealing portion 76 that is radially coextensive with the shoulder 46'. The remaining sealing bead 74' is on the other hand axially coextensive with the other shoulder 40' and enlarged and angled inwardly as compared with its counterpart in FIG. 3 so as to be more compliant and deflected inwardly at assembly as seen in FIG. 3B and tightly sealed against an extension 78 of the elastomeric body 16' onto the shoulder 62' of its retainer collar 30' while the partition capturing elastomeric shoulder or wall sections 40' and 46' are preloaded against the rim 44' of the partition 36' to a predetermined extent depending on the partition amplitude responsiveness desired as determined by the edge 60' of the lower mounting member 12' engaging the shoulder 62' of the retainer collar. This clamping also serves to seal the flat rim sealing portion 76 against the lower mounting member 12' and together with the extra tight sealing provided by the more compliant angular sealing bead 74' allows for omission of the edge sealing bead 75 shown in FIG. 3.

Figure 5:
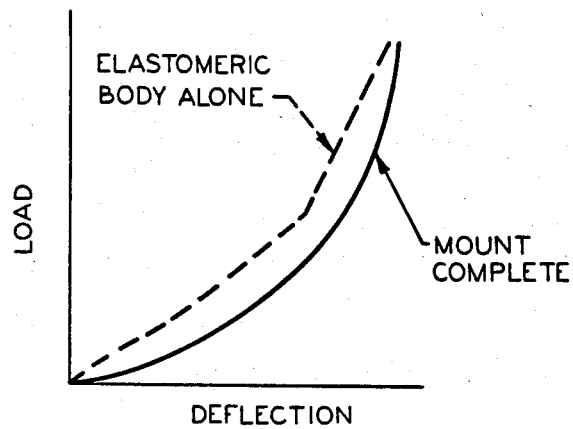
Figure 6:
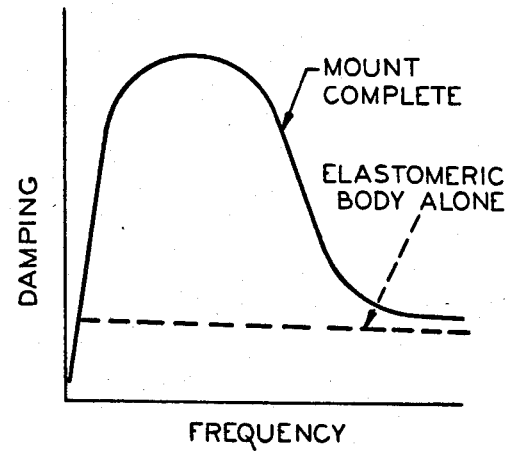
Figure 7:
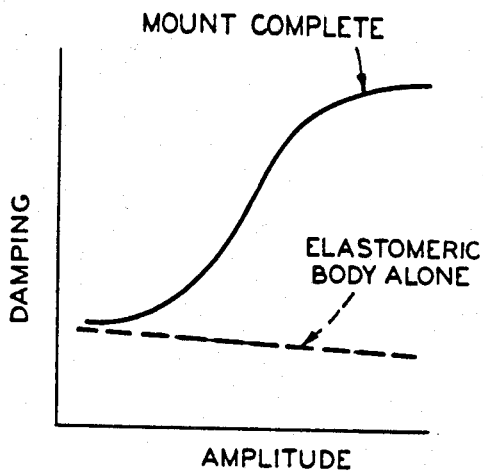
Figure 8:
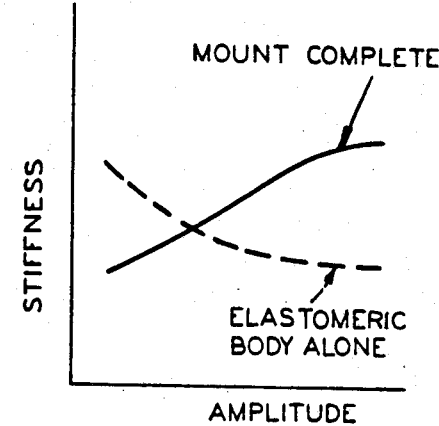

To further aid in understanding the mount, reference is now made to the mechanical analogy thereof shown in FIG. 4 and the graphs in FIGS. 5–10 and wherein it will be understood that such analogy as applied to the FIGS. 1–3 embodiment applies similarly to the FIGS. 3A–3B embodiment. In the mechanical analogy in FIG. 4, the elastomeric body 16 operating alone (no hydraulic damping) has an inherent spring constant k and a coefficient of damping c and in typical adaptation without hydraulic damping for a typical vehicle engine installation with the shape shown would produce the characteristics shown graphically in dash line in FIGS. 5–8. For example, in FIG. 5 wherein load is plotted against deflection, there would normally be a distinct transition point (feel) between a desired relatively soft rate over a majority of the deflection range and a hard rate in the remaining large deflection range. And because the inherent damping characteristics of rubber are relatively low and substantially constant there is essentially no response of the damping to either frequency as shown in FIG. 6 or amplitude as shown in FIG. 7. And thus damping with just the elastomeric body cannot be radily targeted to a particularly troublesome frequency such as caused by vehicle structure resonance nor can the damping be readily strategically targeted for specific amplitude response such as in the typical engine installation wherein a small damping effect is desired at low amplitude and high frequency of the engine and a large damping effect is desired at high amplitude and low frequency. Furthermore, the rubber normally softens with increasing amplitude and as a result the stiffness falls off therewith as shown in FIG. 8 whereas the reverse is desired to assist in amplitude control.

Referring now back to the mechanical analogy in FIG. 4, the hydraulic damping arrangement of the present invention adds to the elastomeric body's spring stiffness k and coefficient of damping c with what will be referred to as (1) a wall bulge stiffness k' resulting from the wall section 72, (2) a diaphragm stiffness k" resulting from the diaphragm central portion 42, (3) a coefficient of damping c' resulting from the primary and secondary chambers 66 and 68 and connecting orifice 70, and (4) free soft travel $x^0$ resulting from primarily the compliance of the diaphragm rim 38 and secondarily the slip fit of the orifice member 37. As shown in the mechanical analogy, the wall bulge stiffness k' is connected in series with both the diaphragm stiffness k"

and the orifice damping coefficient c' which are in turn both connected in series with the free travel $x^0$. The improved result provided by the coaction of all the mount elements is shown in solid line in FIGS. 5–8. For example, as shown in FIG. 5, the deflection is now caused to gradually increase with load throughout the deflection range thereby avoiding any distinct transition point and eliminating a distinct feel. On the other hand, as shown in FIG. 6, the net effective damping with the hydraulic damping c' is not relatively constant but bell-shaped over the frequency range and by selection of the size of the single orifice 70 and the stiffness k' and k" of the body wall 72 and diaphragm midsection 42 may be concentrated or tuned at a specific frequency so as to best diminish certain problematic vibrations in a particular installation. As shown in FIG. 7 and with the effective damping no longer relatively constant with amplitude or frequency and because of the free soft travel $x^0$, only small damping is provided at low amplitudes (high frequency) with the damping thereafter increasing rapidly with amplitude and substantially leveling off with large damping at large amplitudes (low frequency). The very desirable advantage of minimum damping for small amplitudes is made possible primarily by the free soft travel of the partition 36 permitted by the compliance of the diaphragm rim shoulders 40, 46 and secondarily by the fluid displaced with the telescoping motion of the orifice member 37 by reason of its slip fit in the partition. And because of the added wall bulge stiffness k' and diaphragm stiffness k" coupled with the hydraulic damping the net effective stiffness rather than falling off with amplitude now increases with same as shown in FIG. 8.

Reference is now made to FIGS. 9 and 10 to further illustrate the improved performance provided by the hydraulic-elastomeric mount of the present invention. In FIGS. 9 and 10, loss angle and dynamic rate are plotted respectively versus amplitude comparing the mount with and without hydraulic fluid. As can be seen in FIG. 9 and without hydraulic fluid, the loss angle as therein defined increases gradually and very little with amplitude whereas with the hydraulic fluid added the loss angle desirably increases steeply with amplitude and to a much greater extent (e.g. over double) and this occurs in the lower half of the amplitude range and thereafter remains relatively constant. On the other hand and as shown in FIG. 10, without hydraulic fluid the dynamic rate continues to decrease with amplitude whereas with addition of the hydraulic fluid the dynamic rate after initial fall off remains relatively constant.

The hydraulic-elastomeric mount according to the present invention is thus quite predictable and may be readily adapted and tuned to meet a specific application to give the desired spring stiffness, coefficient of damping and resulting dynamic rate calculated to best isolate a particular set of vibration conditions. In other words, a family of mounts is cost effectively offered with selectability of such parameters as the durometer of the rubber used in both the elastomeric body and the diaphragm, the wall section thickness and angles of the elastomeric body, the preload of the diaphragm and the diameter, length and shape of the insertable orifice.

The embodiments of the invention in which an exclusive property or privieige is claimed are defined as follows:

1. A hydraulic-elastomeric mount comprising a pair of mounting means, a hollow elastomeric body operatively connecting said mounting means, an elastomeric diaphragm having a rim portion clamped to one of said mounting means between opposed annular clamping portions thereof so as to close said elastomeric body with one side of said diaphragm and form therewith a closed cavity, a rigid partition extending between said clamping portions and mounted in said diaphragm rim portion so as to be directly engaged and sandwiched thereby and clamped therewith to said one mounting means and divide said cavity into a primary hydraulic chamber enclosed by said elastomeric body and a secondary hydraulic chamber enclosed by said diaphragm, a liquid contained in said chambers, an orifice through said partition interconnecting said chambers so as to permit liquid in said primary chamber to flow at a restricted rate into said secondary chamber upon contraction of said primary chamber and in the opposite direction on expansion thereof to thereby provide a damping effect, said diaphrgm rim portion on said one side having an integral annular axially outwardly projecting bead with an axially outwardly facing face sealing portion extending along the length thereof that engages and complies to the associated annular clamping portion on said one diaphragm side on the clamping of said diaphragm rim portion and partition to said one mounting means to effect tight sealing between the chambers and atmosphere, said diaphragm rim portion on said one diaphragm side having an inwarding facing annular groove radially inward of said bead receiving the periphery of said partition so as to alone effect the clamped mounting of same between said clamping portions and also tight sealing between said chambers, said diaphragm rim portion having integral inwardly projecting annular shoulders forming the sides of said groove of less effective compliance than said bead that are preloaded to a predetermined degree against said partition on the clamping of said diaphragm rim portion and partition to said one mounting means so as to not disturb said sealing while permitting limited substantially free reciprocal travel of said partition relative to said one mounting means below a predetermined vibration amplitude of said one mounting means relative to the other and preventing such travel above such amplitude so that flow through said orifice to effect damping does not occur until said predetermined vibration amplitude is exceeded.

2. A hydraulic-elastomeric mount comprising a pair of mounting means, one of said mounting means comprising a mounting member having a retainer member secured thereto, a hollow elastomeric body operatively connecting the other mounting means to said retainer member, an elastomeric diaphragm having a rim portion clamped to said one mounting means between opposed annular clamping portions on said mounting member and retainer member so as to close said elastomeric body with one side of said diaphragm and form therewith a closed cavity, a rigid partition extending between said clamping portions and mounted in said diaphragm rim portion so as to be directly engaged and sandwiched thereby and clamped therewith to said one mounting means and divide said cavity into a primary hydraulic chamber enclosed by said elastomeric body and a secondary hydraulic chamber enclosed by said diaphragm, a liquid contained in said chambers, an orifice through said partition interconnecting said chambers so as to permit liquid in said primary chamber to flow at a restricted rate into said secondary chamber upon contraction of said primary chamber and in the opposite direction on expansion thereof to thereby provide a damping effect, said diaphragm rim portion on said one side having an integral annular axially outwardly projecting bead with an axially outwardly facing face sealing portion extending along the length thereof that engages and complies to the annular clamping portions on said retainer member on the clamping of said diaphragm rim portion and partition to said one mounting means to effect tight sealing between the chambers and atmosphere, said diaphragm rim portion on said one side having an inwardly facing annular groove radially inward of said bead receiving the periphery of said partition so as to alone effect the clamped mounting of same between said clamping portions and also tight sealing between said chambers, said diaphragm rim portion having inwardly projecting annular shoulders forming the sides of said groove of less effective compliance than said bead that are preloaded to a predetermined degree against said partition on the clamping of said diaphragm rim portion and partition to said one mounting means so as to not disturb said sealing while permitting limited substantially free reciprocal travel of said partition relative to said one mounting means below a predetermined vibration amplitude of said one mounting means relative to the other and preventing such travel above such amplitude so that flow through said orifice to effect damping does not occur until said predetermined vibration amplitude is exceeded.

3. A hydraulic-elastomeric mount comprising a pair of mounting means, a hollow elastomeric body operatively connecting said mounting means, an elastomeric diaphragm having a rim portion clamped to one of said mounting means between opposed annular clamping portions thereof so as to close said elastomeric body with one side of said diaphragm and form therewith a closed cavity, a rigid partition extending between said clamping portions mounted in said diaphragm rim portion so as to be directly engaged and sandwiched thereby and clamped therewith to said one mounting means and divide said cavity into a primary hydraulic chamber enclosed by said elastomeric body and a secondary hydraulic chamber enclosed by said diaphragm, a liquid contained in said chambers, an orifice member mounted for limited relatively free reciprocal travel in said partition in response to pressure thereon in said chambers, said orifice member having an orifice interconnecting said chambers so as to permit liquid in said primary chamber to flow at a restricted rate into said secondary chamber upon contraction of said primary chamber and in the opposite direction on expansion thereof the thereby provide a damping effect following relative travel of said orifice member, said diaphragm rim portion on said one side having an integral annular axially outwardly projecting bead with an axially outwardly facing face sealing portion extending along the length thereof that engages and complies to the associated clamping portion on said one diaphragm side on the clamping of said diaphragm rim portion and partition to said one mounting means to effect tight sealing between the chambers and atmosphere, said diaphragm rim portion having an inwardly facing annular groove receiving the periphery of said partition so as to alone effect the clamped mounting of same between said clamping portions and also tight sealing between said chambers, said diaphragm rim portion on said one diaphragm side having inwardly projecting annular shoulders radially inward of said bead forming the sides of said groove of less effective compliance than said bead that are preloaded to a predetermined degree against said partition on the clamping of said diaphragm rim portion and partition to said one mounting means so as to not disturb said sealing while permitting limited substantially free reciprocal travel of said partition relative to said one mounting means below a predetermined vibration amplitude of said one mounting means relative to the other and preventing such travel above such amplitude so that flow through said orifice to effect damping does not occur following relative travel of said orifice member until said predetermined vibration amplitude is exceeded.

* * * * *